United States Patent [19]
Elliott

[11] Patent Number: 5,626,354
[45] Date of Patent: May 6, 1997

[54] BICYCLE TRANSMISSION AND THE METHOD OF UTILIZING THE SAME

[76] Inventor: David H. Elliott, 10510 N. Oakwilde, Stockton, Calif. 95212

[21] Appl. No.: 444,032

[22] Filed: May 18, 1995

Related U.S. Application Data

[63] Continuation-in-part of Ser. No. 254,611, Jun. 6, 1994, abandoned.

[51] Int. Cl.[6] .................................................. B62M 11/04
[52] U.S. Cl. ........................... 280/236; 280/259; 476/18; 476/22; 476/39; 476/51; 476/63
[58] Field of Search .................................. 280/210, 236, 280/238, 259, 260; 476/15, 18, 21–23, 39–41, 47–48, 50–51; 74/63, 392, 393, 395, 594.3, 721; 192/46, 64

[56] References Cited

U.S. PATENT DOCUMENTS

| | | | |
|---|---|---|---|
| 1,116,373 | 11/1914 | Besserdich | 476/22 |
| 2,917,934 | 12/1959 | Bielsen | 74/721 |
| 4,447,068 | 5/1984 | Brooks | 280/260 |
| 4,856,357 | 8/1989 | David | 74/63 |
| 5,136,892 | 8/1992 | Ochs | 280/238 X |

FOREIGN PATENT DOCUMENTS

| 2251586 | 7/1992 | United Kingdom | 280/238 |
|---|---|---|---|

Primary Examiner—Brian L. Johnson
Assistant Examiner—Victor E. Johnson
Attorney, Agent, or Firm—Daniel L. Dawes

[57] ABSTRACT

A continuously variable friction drive transmission for a bicycle is provided by driving the rear bicycle wheel by frictional engagement with a rotating rim driver. The rim driver has a lateral conical surface matching a lateral conical surface of a driver plate. A transmission driver wheel is selectively positioned between the lateral conical surfaces of the rim driver and driver plate. The position along a shifting arm of the transmission driver wheel determines the speed ratios obtained between the driver plate and rim driver. The driver plate is then rotated by the pedal assembly through a speed increasing coupling. The transmission driver wheel is always in contact with the driver plate. When the driver plate ceases to rotate and the rear wheel and rim driver continue to rotate, the force on the transmission driver wheel automatically rotates the shifting arm on which the transmission driver wheel is coupled to kick the transmission driver wheel out of engagement with the conical surface of the rim driver thereby allowing the rear bicycle wheel to freewheel. The transmission driver wheel is returned into mutual engagement between the conical surfaces of the driver plate and rim driver, when the driver plate again rotates at a speed fast enough to couple the driver plate and rim driver again into a force transmitting relationship.

18 Claims, 6 Drawing Sheets

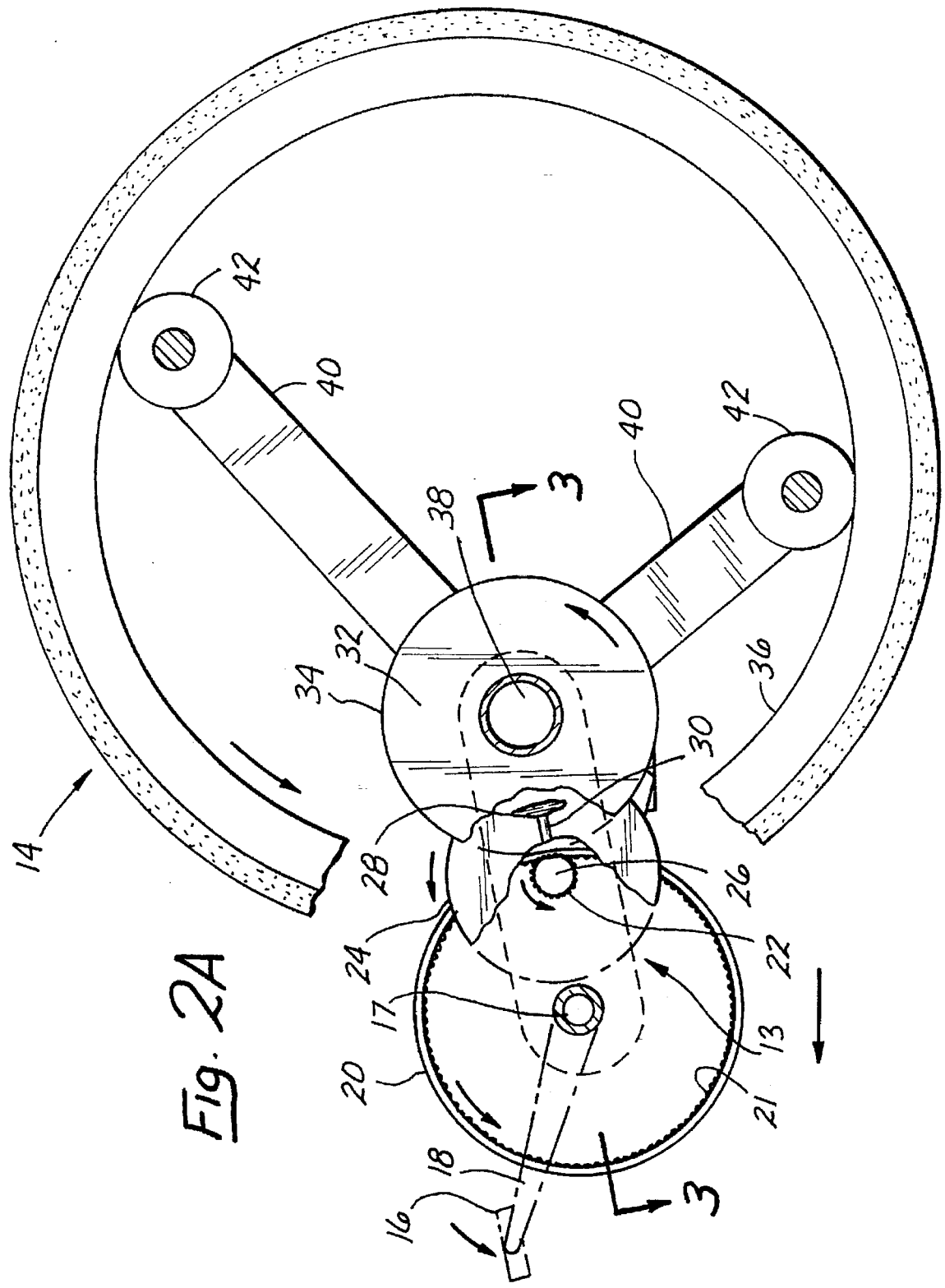

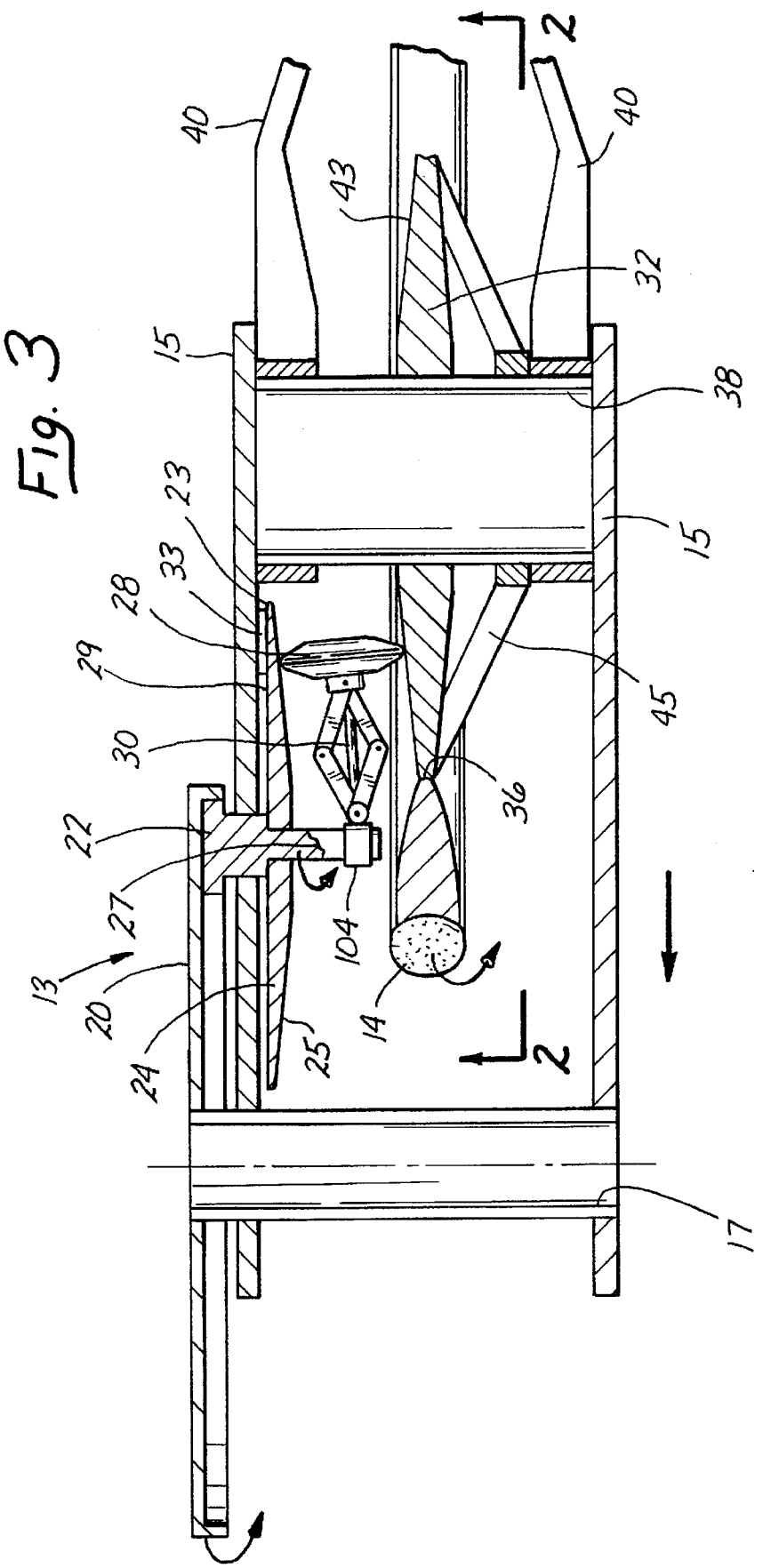

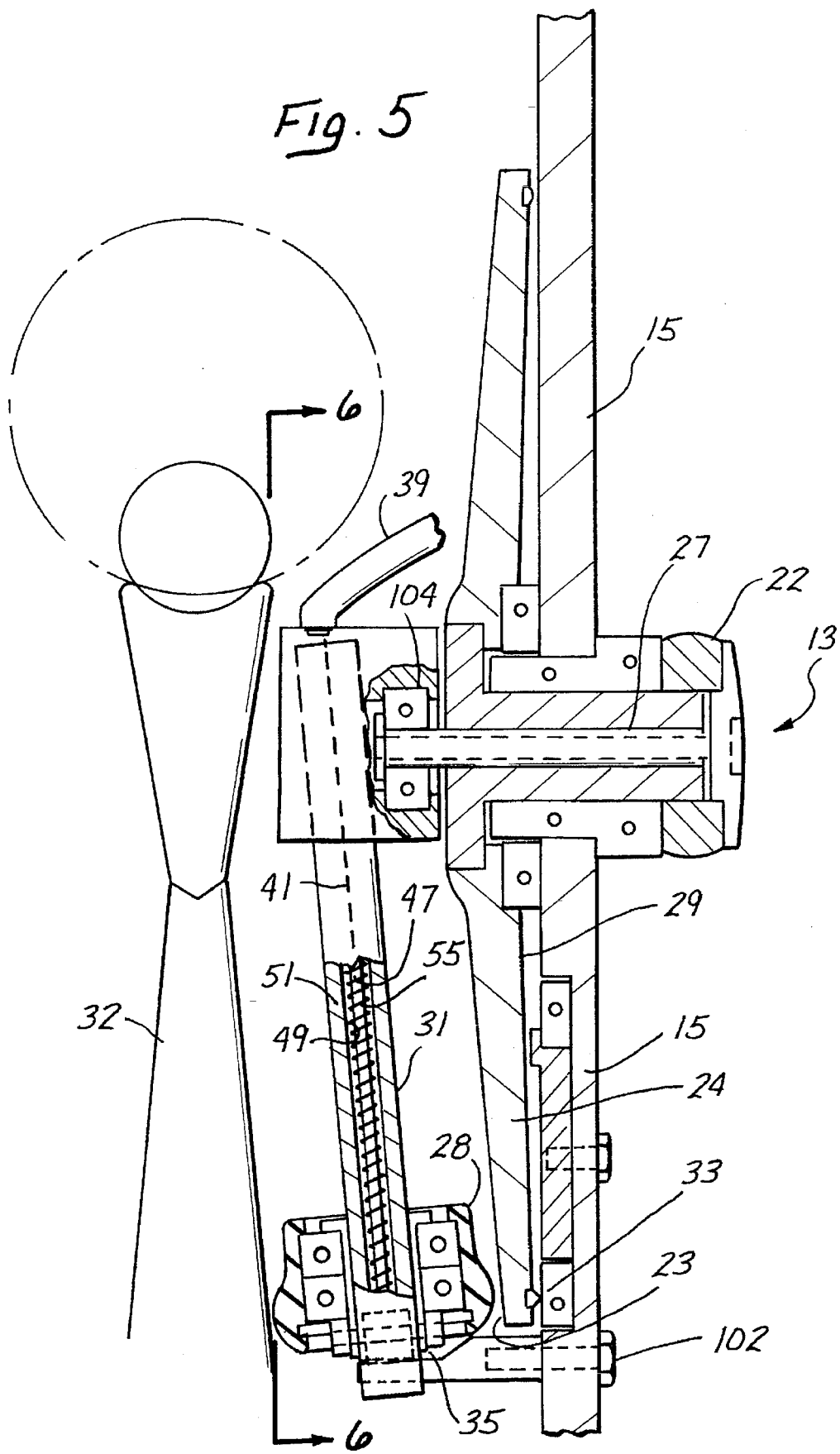

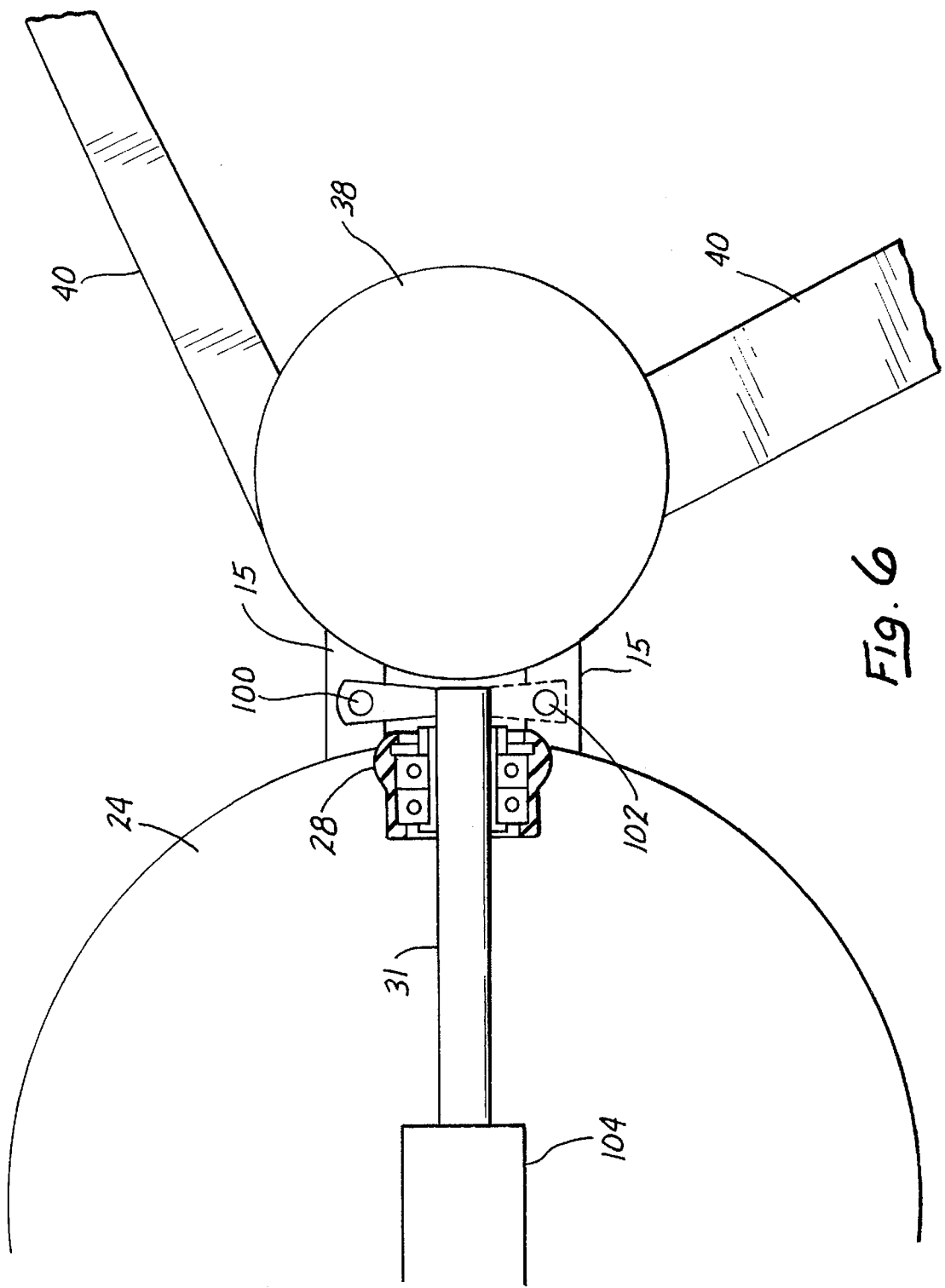

BICYCLE TRANSMISSION AND THE METHOD OF UTILIZING THE SAME

RELATED APPLICATIONS

The present application is a continuation-in-part application of an application filed Jun. 6, 1994, Ser. No. 08/254,611, now abandoned.

BACKGROUND OF THE INVENTION

1. Field of the Invention

The invention relates to the field of bicycle transmissions and in particular to transmissions designed to substitute the conventional chain transmission with one that provides a continuously variable transmission ratio.

2. Description of the Prior Art

Frictional transmissions are known in the art. Duryea, "Bicycle," U.S. Pat. No. 333,936 (1886), describes a transmission for a bicycle comprising a pedal crank J, combined with a series of gears J1, K1, K2 and L1. Wheel A is frictionally driven by pulley wheel L2. Wheel is supported between drive pulley L2 and two pulley wheels F and I each disposed at opposing ends of an arm H and supported by a standard D. Duryea shows a three-pulley wheel system inside the rim of a supported wheel, driven through a direct geared transmission from a pedal crank as opposed to a chain drive transmission as commonly used with current bicycles. Duryea however depends on the use of a complicated and unreliable direct gear transmission between pedal crank J and drive pulley wheel L2.

Mead, "Device for Changing Speed," U.S. Pat. No. 168,912 (1875), shows an infinitely variable transmission, having power transferred from a drive shaft A to a driven shaft B by a pair of conically shaped plates which are rotatively coupled together by means of an idler assembly D—D which is axially displaceable on shaft C. Idler wheels D—D are rigidly coupled together on shaft C and, therefore, function as if they were a single wheel, notwithstanding the fact of their spatial displacement from each other. Mead appears to operate with respect to the two conical surfaces in idler wheel D, but there does not appear to be any means which would allow wheels D of Mead to rotate out of the plane of FIG. 1 to allow for freewheeling or a neutral position which is essential in a practical bicycle transmission.

Schmelzer, "ii Friction Drive Mechanism," U.S. Pat. No. 2,074,868 (1937), describes a frictional drive system which provides a smooth gradual acceleration of a rotating member. In FIG. 1, power is supplied through a drive shaft 21 for rotating a driver plate 24. Driver plate 24 has a conical driving surface. Driven plate 41 is also provided with a substantially conical face 42. A friction wheel 36 is axially displaceable on shaft 32 and provided to change the coupling ratio between the driver and driven disks. However, shaft 32 is not able to rotate to allow the idler wheel to pivot out of contact with the driver and driven plates to permit free rotation.

Johnson et al., "Variable Speed Transmission Device," U.S. Pat. No. 2,325,323 (1943), shows in FIGS. 1–4 a drive shaft 25 coupled to a driver plate 23 having a conical engaging surface 24. Torque is transferred from driver plate 23 to driven plate 16 which has a conical engaging face 17. Driven plate 16 is rotatively coupled to a driven shaft 20. Transfer of torque is by means of a transmission ring or idler 53 rotatively supported from an arm 39. Arm 39 is displaceable on a threaded control rod 32 for varying the coupling ratio between the drive shaft and driven shaft. Transmission ring 53 is pivotable by virtue of the arcuate slots 30 and adjustment screw 68. This adjustability is intended, however, to provide adjustment to the contact force of the transmission ring with the conical surfaces and it is not intended to provide a means for freewheeling.

Prager, "Friction Gear," U.S. Pat. No. 3,242,748 (1966), shows a steplessly variable friction gear transmission. Prager was cited for showing a mounting for transmission roller 23 as being coupled to a bearing ring 29 through needle bearing 30. Bearing ring 29 is coupled to shaft 28 through an eyelet projection 31 of adjuster 26. Thus, roller 23 is free to rotate relative to shaft 28, similar to your own system.

While Prager would, at a superficial glance, seem to allow for idler roller 23 to rotate out of the plane in FIG. 21, in fact, the negative cone surfaces of disks 10 and 18 prevent it and keep idler wheel 23 jammed in position. Therefore, Prager does not contemplate the possibility of freewheeling in the transmission.

Aranceta-Angoitia, "Transmission for Bicycles," U.S. Pat. No. 4,900,046 (1990), was cited for showing a conventional bicycle wherein wheel rim 27 is frictionally driven by an outlet pinion 25 through engagement with a coupling track 26.

Therefore, what is needed is some type of frictional transmission which provides smooth and positive responses and continuously variable transmission ratios in combination with user-selective freewheeling, which is essential in a bicycle transmission.

BRIEF SUMMARY OF THE INVENTION

The invention is a transmission for a bicycle having a frame, a pedal assembly rotatably coupled to the frame, and a bicycle wheel. The transmission comprises a driver plate coupled and rotated by the pedal assembly, a rim driver rotatably coupled to and rotatable with the bicycle wheel, and a selectively positionable shifting mechanism rotatably coupled to the driver plate and rim driver. The shifting mechanism provides a continuously variable transmission ratio between the driver plate and the rim driver and selectively disengages from the rim driver when the driver plate ceases to rotate, while the rim driver continues to rotate with the bicycle wheel. As a result, a continuously variable free-wheeling bicycle transmission is provided.

The shifting mechanism frictionally couples the driver plate to the rim driver. The rim driver and driver plate are frictionally coupled through the shifting mechanism by means of a transmission driver wheel selectively positioned in contact with the driver plate and rim driver, when force is exerted through the pedal assembly to the bicycle wheel.

The driver plate and rim driver each have a conical surface with an opposing parallel portion of the conical surface disposed adjacent to each other. The transmission driver wheel makes frictional contact with the opposing parallel portions of the conical surface. The shifting mechanism maintains the transmission driver wheel in contact with the conical surface of the driver plate.

The driver plate has an axis of rotation and the shifting mechanism is rotatable about the axis of rotation of the driver plate. The transmission driver wheel is rotated about the axis of rotation of the driver plate out of and into contact with the conical surface of the rim driver according to whether force is being applied through the pedal assembly to the bicycle wheel or not.

The transmission further comprises a crank ring coupled to and rotatable with the pedal assembly. The crank ring is coupled to the driver plate to rotate the driver plate through a speed increasing coupling thereto. The crank ring has a peripheral edge and the crank ring is frictionally coupled to the driver plate along the internal portion of the peripheral edge. The transmission further comprises a driver cog coupled to the driver plate. The crank ring is coupled to the driver cog to turn the driver cog at an increased angular speed relative to angular speed of the pedal assembly.

In another embodiment the driver cog and crank ring have gear teeth. The gear teeth of the driver cog are enmeshed with the gear teeth of the crank ring.

The transmission further comprises at least one support bearing coupled to the frame. The support bearing contacts the driver plate to stiffen the driver plate to reduce flexing of the driver plate when in contact with the shifting mechanism. The rim driver further comprises a reinforcing hub cap to prevent the rim driver from flexing when in contact with the shift mechanism.

The invention is also defined as a transmission for a bicycle having a frame, pedal assembly and bicycle wheel. The transmission comprises a drive shaft, and a driver plate coupled to and rotatable with the drive shaft. The driver plate is coupled to and rotated by the pedal assembly. The pedal assembly is comprised of a crank ring coupled to a conventional crank arm and pedal set. The crank ring is rotatably coupled to a driver cog. The driver cog is coupled to the driver plate. The driver plate has a conical surface with a predetermined taper. A shifting mechanism is rotatably coupled to the drive shaft. The shifting mechanism has a longitudinal length and is disposed to retain a parallel direction at all times with the conical surface of the driver plate. A transmission driver wheel is rotatably coupled to the shifting arm and is selectively disposable along the longitudinal length of the shifting arm. The wheel assembly is comprised of a rotatable rim driver, which is coupled to the bicycle wheel for rotating the bicycle wheel with the rim driver. The rim driver has a conical surface with a taper substantially matching the predetermined taper of the driver plate. The transmission driver wheel is selectively disposable between the conical surface of the rim driver and the conical surface of the driver plate to transmit rotary force between the driver plate and rim driver when the pedal assembly rotates the driver plate. The transmission driver wheel automatically moves out of contact with the rim driver after the driver plate ceases to transmit rotary force between the pedal assembly and the bicycle wheel. As a result, a continuously variable frictionally driven transmission is provided for the bicycle which also permits free wheeling of the bicycle wheel.

The invention is also characterized as a method of providing continuously variable speed transmission between a pedal assembly and a bicycle wheel comprising the steps of converting pedaling motion through the pedal assembly into rotary motion of a driver plate. The driver plate has a conical surface with a predetermined taper. A transmission driver wheel is maintained rotatable about a shifting arm and is in contact with the conical surface of the driver plate at all times. The transmission driver wheel is moved with the shifting arm into simultaneous contact between the driver plate and a rim driver having a conical surface in contact with the transmission driver wheel. The conical surface of the rim driver has a predetermined taper substantially equal to the predetermined taper of the driver plate. A rotary force is transmitted from the pedal assembly through the driver cog and transmission driver wheel into the rim driver and bicycle wheel to rotate the bicycle wheel. As a result, a frictional transmission which is continuously variable is provided between the pedal assembly and bicycle wheel.

The method further comprises the step of moving the transmission driver wheel longitudinally along the shifting arm to vary speed transmission from the pedal assembly to the bicycle wheel.

The method further comprises the step of selectively moving the transmission wheel out of contact with the rim driver when the rotary force is no longer supplied between the pedal assembly and the bicycle wheel to permit the bicycle wheel to freewheel with respect to the pedal assembly.

The invention may be better visualized by now turning to the following drawings wherein like elements are referenced by like numerals.

BRIEF DESCRIPTION OF THE DRAWINGS

FIG. 2A is a diagrammatic side view of the invention showing gear teeth on a driver cog and a crank ring.

FIG. 3 is a diagrammatic cross sectional view of the transmission as seen through sectional lines 3—3 of FIG. 2.

FIG. 5 is a diagrammatic view of another embodiment of the transmission wherein positive limit stops have been provided.

FIG. 6 is partially cut-away side elevational view of the shifting mechanism of FIG. 5 as seen through section lines 6—6.

The invention and its various embodiments may now be better understood by turning to the following detailed description.

DETAILED DESCRIPTION OF THE PREFERRED EMBODIMENTS

A continuously variable friction drive transmission for a bicycle is provided by driving the rear bicycle wheel by frictional engagement with a driven, rotating rim driver. The rim driver has a lateral conical surface matching a lateral conical surface of a driver plate. A transmission driver wheel is selectively positioned between the lateral conical surfaces of the rim driver and driver plate. The position along a shifting arm of the transmission driver wheel determines the speed ratios obtained between the driver plate and rim driver. The driver plate is then rotated by the pedal assembly through the speed increasing means, such as a gear train. The speed increasing means comprises a crank ring, which is rotated by the pedal assembly and which engages a drive wheel or gear coupled to the driver plate. The shifting arm is rotatably coupled to the drive axis connected to the driver plate. The shifting arm is also parallel to the tapered conical surface of the driver plate at all times to thereby always maintain the transmission driver wheel in contact with the driver plate.

When the driver plate ceases to rotate and the rear wheel and rim driver continue to rotate, the force on the transmission driver wheel automatically rotates the shifting arm on which the transmission driver wheel is coupled to kick the transmission driver wheel out of engagement with the conical surface of the rim driver thereby allowing the rear bicycle wheel to freewheel.

The transmission driver wheel is returned into mutual engagement between the conical surfaces of the driver plate and rim driver, when the driver plate again rotates at a speed fast enough to couple the driver plate and rim driver again into a force transmitting relationship. Clockwise and counterclockwise rotation of the shifting arm carrying the transmission driver wheel may be limited by mechanical stops. In another embodiment without any stops, rotation of shifting arm 30 is limited in one direction by the inherent noncompressibility of the transmission driver wheel. Rotation in the opposite direction is limited in practice by a combination of factors including the friction in the bearing coupling the shifting arm to the axis of the driver plate and in the bearing coupling the transmission driver wheel 28 to shifting arm 30, by the spring force of cable 39, and gravity.

Figure 1:
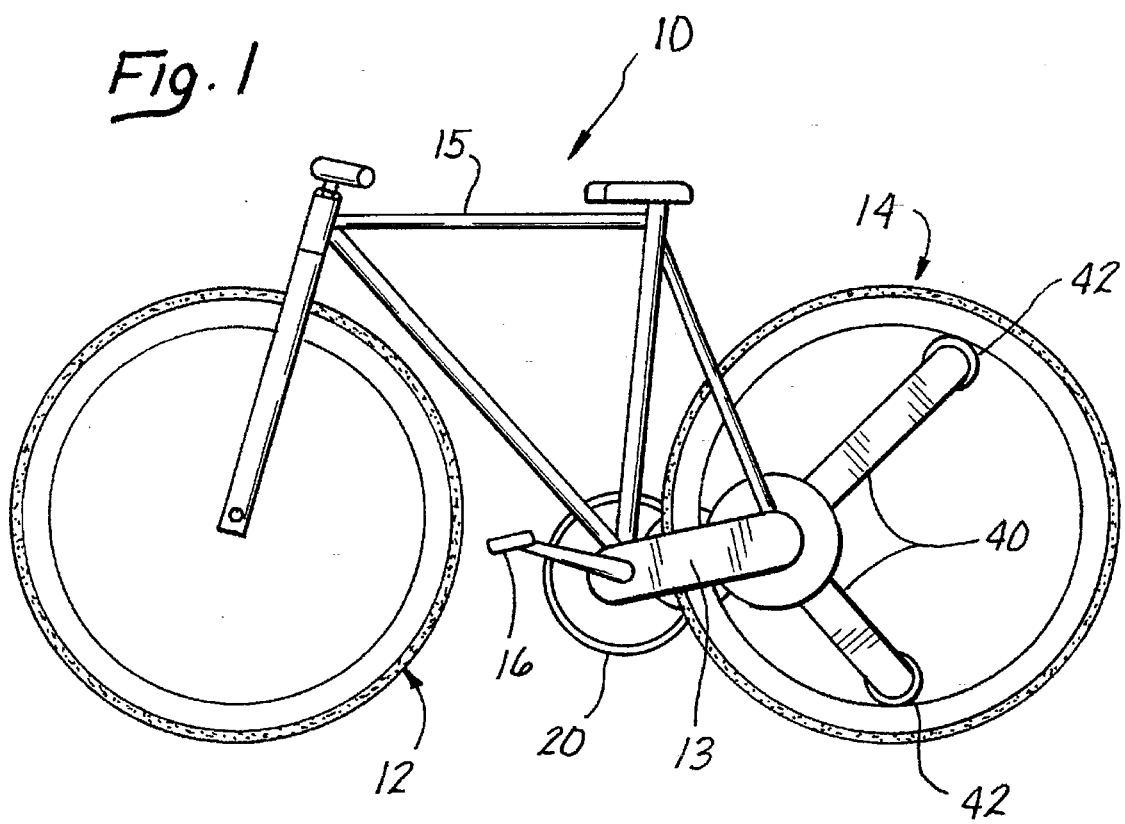
FIG. 1 is an elevational side view of a bicycle incorporating the invention.

FIG. 1 is a diagrammatic side view of a bicycle 10 illustrating the principles of the present invention. Bicycle 10 includes a conventional front wheel 12 and rear wheel 14. Bicycle frame 15 is partially shown in the sectional view of FIG. 3 taken through lines 3—3 of FIG. 2, and in dotted outline in FIG. 2, but the frame is otherwise deleted for the sake of simplicity from the depiction of FIG. 2. The shape and construction of the frame is largely incidental to the design of the transmission except as described below and may assume any configuration or structure consistent with the teachings of the invention. For this reason, only that portion of the frame 15 as is relevant to the transmission have been described or illustrated.

Power is delivered by the cyclist to transmission 13 through a conventional foot pedal 16 pivotally coupled to a conventional crank arm 18. Crank arm 18 is connected and rotates around a central pivot 17 which is fixed to frame 15. Foot pedal 16, crank arm 18 and pivot 17 comprise a conventional pedal assembly. Also connected to pivot 17 is a crank ring 20. Crank ring 20 may take various forms, but in the illustrated embodiment it comprises a circular plate having an inner lip 21 similar in structure to the top portion of a closed cylinder. Again the detailed form of crank ring 20 is largely incidental to the invention.

Lip 21 frictionally engages a driver cog 22 which is rotated about pivot 26, which is journalled to frame 15 as best depicted in FIG. 3. Alternatively, driver cog 22 may be a geared wheel enmeshed with similar gearing provided on lip 21 of crank ring 20. Frictional coupling is simpler and less expensive, but any type of coupling which provides for the rotational coupling of the pedal assembly to driver cog 22 may be used. In the illustrated embodiment the coupling is a speed-increasing coupling so that there is an increase in angular speed of drive cog 22 compared to crank ring 20.

Driver cog 22, in turn, is coupled through a driver axis shaft 27 to a driver plate 24 as depicted in a first embodiment in FIG. 3 and in a second embodiment in FIG. 5. Driver plate 24 is fixed to and rotates with shaft 27 and driver cog 22. As seen in FIGS. 3 and 5, driver plate 24 is in the shape of a truncated cone having an inner conical surface 25 directed inwardly toward rear wheel 14. Surface 25 is a frictional surface and may be provided with any type of surface layer or coating now known or later devised to enhance its frictional and wear characteristics. The afterend 23 of driver plate 24 is supported on its outer surface 29 by support bearing 33, again, best depicted in FIGS. 3 and 5. Support bearing 33 provides mechanical support to limit the deflection or flexing of driver plate 24, while providing low frictional contact with flat outer surface 29. Support bearing 33 may, for example, include a roller bearing or other type of low rolling friction surfaces or structures while providing mechanical back support to prevent deflection of driver plate 24.

Figure 4:
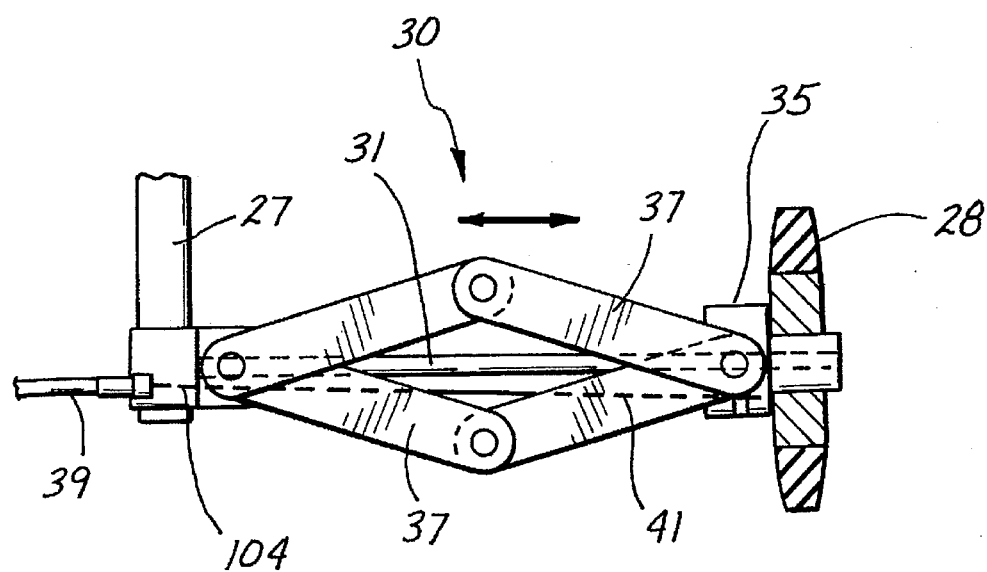
FIG. 4 is a diagrammatic side view in enlarged scale of the shifting mechanism shown in FIGS. 1 and 2 shown in isolation of the other elements of the transmission.

Rotatably coupled to the inboard end of shaft 27 is shifting mechanism 30 best depicted in the side elevational enlarged view of FIG. 4 and FIG. 5. Shifting mechanism 30 in FIGS. 4 and 5 is rotated 90 degrees or seen from the side as compared to the orientation of FIG. 3 where it is seen from the top. Shifting mechanism 30 is comprised of rigid arm 31 connected to shaft 27 through a bearing coupling 104. At the opposing end of arm 31 is transmission driver wheel 28, which is rotatably connected and retained on a fitting 35 which is longitudinally slidable along the length of arm 31.

In the embodiment of FIGS. 5 and 6 the rotation of arm 31 about shaft 27 is limited in both the counterclockwise and clockwise directions by mechanical limits 100 and 102 as best seen in the side elevational view of FIG. 5. Limits 100 and 102 are fixed to frame 15. As seen in FIG. 6 limit 100 serves as an upper stop to prevent counterclockwise rotation of arm 31 in the view of FIG. 6, while limit 102 serves as a lower stop to prevent clockwise rotation of arm 31 in the view of FIG. 6.

Similar limits may be provided in the embodiment of FIG. 3, or may be omitted with limitation of rotation controlled by the inherent noncompressibility of wheel 28 and the friction of a bearing 104 as described below.

Transmission driver wheel 28 is a frictional wheel and is preferably made of an abrasive resistant, elastomeric substance and is designed for frictional contact with conical surface 25 of driver plate 24. Fitting 35 is coupled to opposing bearing coupling 104 by means of a four bar linkage 37 which is pivotally coupled at each of its opposing ends to bearing coupling 104 and fitting 35. A coil spring, not shown, is longitudinally disposed about arm 31 to resiliently urge transmission driver wheel 28 outwardly on arm 31. A conventional bicycle transmission cable 39 is led through bearing coupling 104 and the cable wire 41, shown in dotted outline in FIG. 4, slidingly extends through bearing coupling 104 and is connected to opposing driver wheel fitting 35. The cyclist may, thereby, retract and extend wire 41 through cable 39 to selectively position drive wheel 28 at any point longitudinally along arm 31.

In a second embodiment of FIG. 5 the four bar linkage is replaced by a slidable engagement between arm 31 and fitting 35. Fitting 35 is connected to the end of a spring loaded rod 47 which extends internally within a bore 49 defined in arm 31 and is connected to wire 41 at its opposing end. Fitting 35 is coupled to rod 47 by means of a bolt which extends to bore 49 through a slot 51 defined in arm 31. Cable 39 is activated to draw wire 41, rod 47 and hence wheel 28 toward shaft 27 against the compressive force of spring 55. Release of cable 39 release wire 41 and rod 47 to allow fitting 35 and wheel 28 to move away from shaft 27.

Returning to FIGS. 3 and 5, it may readily be appreciated that transmission driver wheel 28 is in simultaneous frictional contact both with driver plate 24 and with a rim driver 32 when in the force transmitting position. Wheel 28 remains in the force transmitting position as depicted in FIGS. 3 and 5 either by means of the positive restraint of upper limit 100 or by virtue of the inherent limit of the compressibility of wheel 28. For example, the diameter of wheel 28 is slightly greater than the smallest distance of separation of driver plate 24 and rim driver 32, which is the force transmitting position. Wheel 28 is jammed or compressed between driver plate 24 and rim driver 32 by being drawn into the force transmitting position. However, either because wheel has an incompressible metal core or simply because of its inherent incompressibility it cannot be squeezed through the force transmitting position. Alternatively, as stated, wheel is prevented from being overcompressed and passing through the force transmitting position by means of mechanical limit 100.

Therefore, when arm 31 is parallel or substantially parallel to surface 43 of rim driver 32, it will be in the force transmitting position. Wheel 28 may be positioned at any location along the longitudinal length of arm 31 and remain in a force transmitting position. Thus, wheel 28 is defined, when arm 31 is in the position of FIGS. 3 and 5, to be in position on a line of force transmitting positions. Wheel 28 is always in contact with surface 25 of plate driver 24, because arm 31 is coupled to shaft 27 by means of bearing coupling 104 which maintains arm 31 in a parallel position to surface 25 regardless of the angular position of arm 31 relative to driver plate 24.

When arm 31 rotates on shaft 27 away from the force transmitting position shown in FIGS. 3 and 5, wheel 28 will fall away from and eventually lose contact with surface 43 of rim driver 32. When arm 31 has rotated such that wheel 28 no longer contacts surface 43, it is defined as being out of the line of force transmitting positions. Because wheel 28 is compressible to some degree and has a finite area of contact with surface 43, what has been defined as a line of force transmitting positions is in reality a zone of force transmitting positions. The frictional force between wheel 28 and surface 43 will also depend on the magnitude of force by which wheel 28 is pressed against surface 43 or on the degree of compression of wheel 28 when in a force transmitting position. Therefore, it should be understood that the degree of frictional engagement or slippage and hence transmission of useful force from wheel 28 to rim driver 32 will vary across the width of the zone or line of force transmitting positions as arm 31 rotates through this zone or line. The movement of arm 31 through the zone of force transmitting positions is so fast and smooth that no substantial variation in the coupling between wheel 28 and rim driver 32 is felt by the cyclist when arm 31 is in the zone.

Rim driver 32 is rotatably coupled to a hub 38 which in turn is connected to frame 15. Rim driver 32 includes an inner conical surface 43 similar in nature to frictional surface 25 of driver plate 24, which surface 25 makes frictional contact with transmission driver wheel 28. The degree of taper of surface 43 substantially matches the degree of taper on surface 25. Driver plate 24 is oriented with respect to rim driver 32 so that in the plane of FIG. 3 and 5 surface 25 is substantially parallel to the directly opposing portion of surface 43 along a line which is the line of force transmitting positions. As a result, when in the configuration depicted in FIGS. 3 or 5, transmission driver wheel 28 may be positioned at virtually any point along the length of arm 31 and still make secure frictional contact with surface 43 of rim driver 32 and friction surface 25 of driver plate 24. Arm 31 is then positioned between and parallel to surfaces 25 and 43. Outside the plane of FIGS. 3 and 5 surfaces 25 and 43 become increasingly nonparallel and as will be seen below transmission driver wheel 28 remains in contact only with surface 25.

Figure 2:
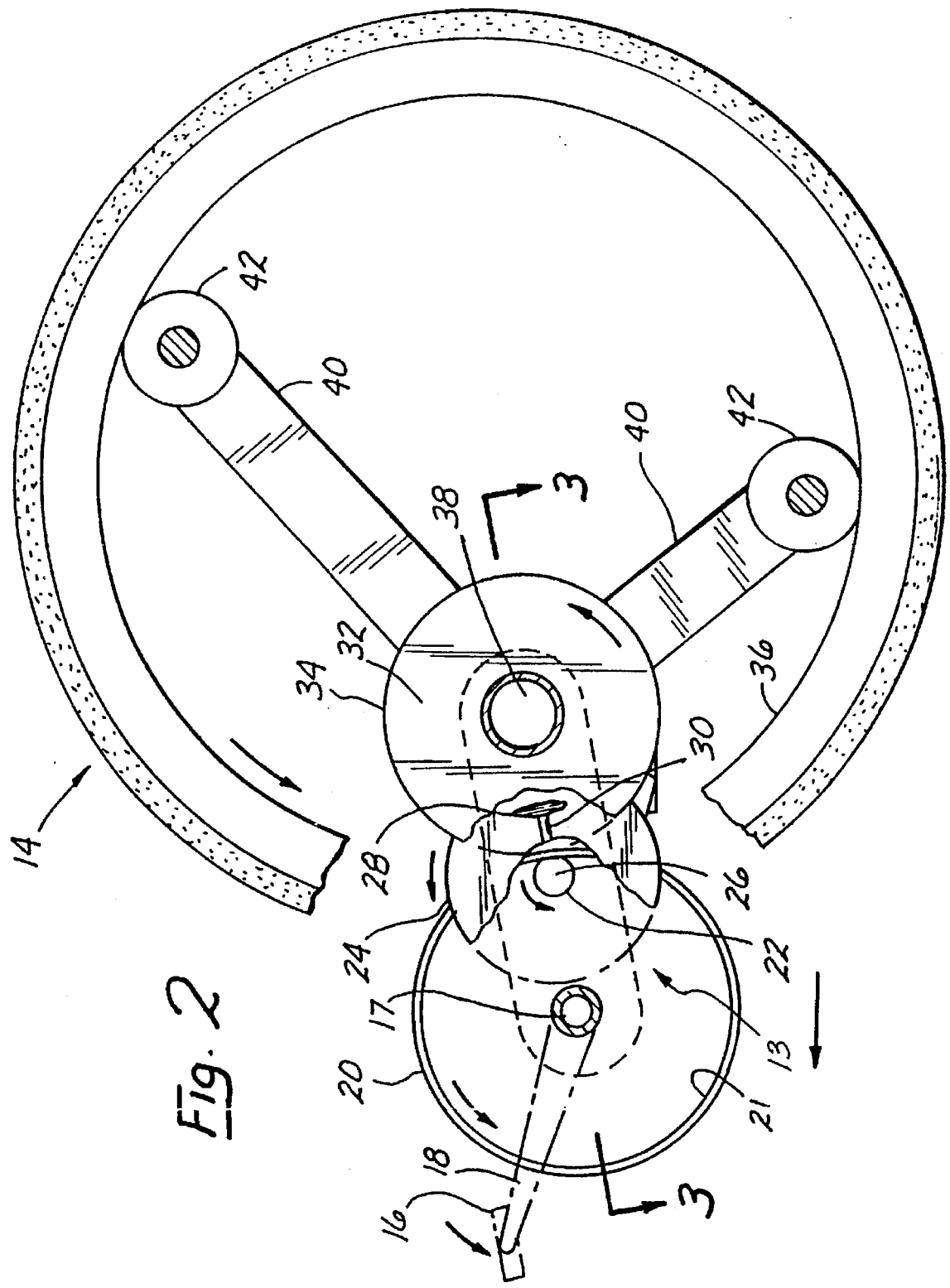
FIG. 2 is a diagrammatic side view of the invention illustrating the coupling between the foot crank and the rear wheel.

In the illustrated embodiment, rim driver 32 is reinforced or stiffened by means of a conical hub cap 45 attached on its circumferential periphery to the outer periphery of rim driver 32 and rotatably coupled at its opposing and inner end to hub 38. Stiffening hub cap 45 is axially stabilized between opposing arms of frame 15 and the hub connecting portion of swing arm 40. Swing arm 40 is an L-shaped rigid arm, rotatably coupled to hub 38 at its center, and extending to support rotatable rim rollers 42 at its opposing ends as depicted in FIG. 2. Wheel 14 is, thus, rotatably fixed within frame 15 by means of swing arm 40, rotatably coupled at its center to frame 15, and at its opposing ends through rim rollers 42 to the inner surface of rim 36 of wheel 14.

Rim driver 32 has a circumferential groove 34, best depicted in FIG. 3, which conforms to and provides frictional contact with an inner surface of rim 36 of wheel 14 as shown in the upper portion of FIG. 3, and as depicted in side view in FIG. 2. By this means, the motive force is transmitted from foot pedal 16 to rear wheel 14. Other means of frictionally engaging rim driver 32 to wheel 14 may be employed with departing from the teachings of the invention.

The basic structure of the device having now been described consider its overall operation. Assume, for example, that the cyclist with his feet on pedal 16 is rotating crank ring 20 in a clockwise direction as seen in FIG. 2. Clockwise direction of crank ring 20 thereby causes driver cog 22 also to be rotated in a clockwise direction in FIG. 2 at increased angular speed. Driver cog 22 and driver plate 24 are thus rotated clockwise and thus cause transmission driver wheel 28 to rotate counterclockwise if it were viewed end-on from arm 31. The rotary motion of transmission driver wheel 28 then causes rim driver 32 to rotate in a clockwise direction as shown in FIG. 2, also causing rim 36 of wheel 14 to rotate in a clockwise direction, thereby driving bicycle 10 forward.

It can thus readily be appreciated by viewing FIGS. 1 and 2 in combination that the speed conversion provided through transmission 13 is solely determined by the position of transmission driver wheel 28 along the longitudinal length of its corresponding arm 31. The further out transmission drive wheel 28 is positioned on driver plate 24 toward the edge of driver plate 24, the greater is its speed for a given rate of rotation of driver plate 24. The linear rate of travel of the surface of transmission driver wheel 28 is thus transmitted to the smaller diameter of rim driver 32 which, thus, rotates about hub 38 at a faster angular rate. The faster angular rate of rim driver 32 translates directly into a faster linear rate, or angular rate, of the frictionally coupled rim 36 of rear wheel 14.

Similarly, as transmission driver wheel 28 is moved inwardly toward shaft 27 along its longitudinal arm 31 for a given rate of rotation of driver plate 24, the angular speed of transmission driver wheel 28 will slow down. The slower linear speed at which transmission driver wheel 28 is translated, in turn, to a slower angular rate of rim driver 32, which is now turning at a slower linear rate at a point further away from its axis of rotation. The slower angular rate of rim driver 32 is directly translated into a slower angular rate of rear wheel 14.

There is no preferred position of transmission driver wheel 28 along arm 31 and, thus, any transmission ratio within the capacity of transmission 13 can be smoothly and continuously achieved without preference. Wheel 28 may be moved longitudinally along arm 31 either while in contact with surfaces 25 or 43, or may be freewheeled out of contact as described below, moved longitudinally along arm 31, and then moved back into contact with surfaces 25 and 43.

However, it is essential in a bicycle transmission that the cyclist be able to stop pedaling and to allow the bicycle to continue to move forward or coast. When the cyclist stops pedaling, driver plate 24 will stop rotating. Rim driver 32, however, will continue to rotate with rear wheel 14. This will cause transmission driver wheel 28 and its arm 31 to rotate in a clockwise direction around shaft 27 as shown in FIG. 2.

When arm 31 does so, wheel 28 falls away or loses contact with surface 43 of rim driver 32. The rotation of arm 31 may be positively limited by lower limit 102 or simply by the frictional drag provided by bearing coupling 104 and fitting 35.

Shaft 31 of the shifting mechanism 30 is angled with respect to drive shaft 27 so that shaft 31 is maintained in a substantially parallel configuration at all times with surface 25 of driver plate 24. Transmission driver wheel 28 is, thus, in frictional contact at all times with surface 25 of driver plate 24. So as driver plate 24 ceases to rotate and rim driver 32 continues to rotate, arm 31 of shifting mechanism 30 will be rotated clockwise in FIG. 2 thereby moving transmission wheel 28 away from surface 43 of rim driver 32, because of the parallel orientation of shaft 31 with respect to surface 25 of driver plate 24.

The bicycle will then coast allowing wheel 14 and rim driver 32 to free wheel. When the cyclist is again ready to begin pedaling, the clockwise rotation of driver plate 24 as seen in FIG. 2 will begin to rotate transmission driver wheel 28, which because its coupling to fitting 35 is not perfectly frictionless, will tend to drag or rotate shifting mechanism 30, and in particular arm 31, clockwise in the depiction of FIG. 2 until transmission driver wheel 28 again touches moving surface 43 of rim driver 32. At this point if rim driver 32 has a slower linear rate at the point of contact than the rim of wheel 28, arm 31 is rotated into the force transmitting position where wheel 28 is again compressed or jammed between the opposing surfaces 43 and 25.

If rim driver 32 has a faster liner rate at the point of contact than driver plate 24, then wheel 28 will be walked down surface 25 of driver plate 24 and arm 31 will be rotated away from the force transmitting position. Once the cyclist pedals fast enough or a gear transmission ratio is chosen which is high enough to cause wheel 28 to have a linear rate at its rim, which rate is faster than the linear rate of rim driver 32 at the point of contact, wheel 28 will then be walked up surface 43 of rim driver 32 and arm 31 will be rotated into the force transmitting position. Further rotation of arm 31 and movement of wheel 28 into or through the line of force transmitting positions is prevented by limit 100 as described above or by the inherent limitation on the compressibility of wheel 28 or both.

The dynamics of operation can be visualized as follows. Imagine a wheel on an endless moving flat belt. If the wheel turned on a perfectly frictionless axle it would simply spin in place. Because the axle is not frictionless, the wheel will spin and tend to move in the same direction of the belt as a function of the friction of its axle. In the extreme case if the wheel were frozen to its axle and could not spin, then it would move without turning with the belt.

Now assume that a similar endless flat belt moving in the opposite direction is disposed above and in contact with the wheel as well. Assume the frictional contact with the two belts is equal and that there is no slippage. If the belts are going at the same speed or are both at rest, the wheel spin, if the belts are moving, but remains in one position. If the belts are moving at different speeds, the wheel will spins and will move in the direction of the faster moving belt. The faster moving belt will in essence walk the wheel over the slower moving belt to make the difference in speed between the two belts. In the extreme case where one belt is stopped and the other is moving at a linear rate equal to the difference in the linear rates of the two belts when both are moving, the wheel will move over the stopped belt in the direction of movement of the moving belt at a rate equal to the rate of the moving belt, i.e. the difference in the linear rates of the two belts.

This is what happens in the present case except the "belts" are the surfaces of rim driver 32 and driver plate 24 and when wheel 28 is moved in one direction it is moved out of contact with one of the "belts" (rim driver 32), and when moved in the other direction, it is moved into a force transmitting position where it stops either by means of a mechanical limit, or is compressed to the point where it can no longer be further compressed. Since further movement can occur only if there is further compression, it stops. At the force transmitting position slippage will occur until the two "belts" are brought to the same speed by means of their coupling through wheel 28. Because of friction throughout the bicycle at every moving point, the speed of rim driver 32 will always lag slightly behind driver plate 24 as long as the cyclist maintains a constant rate of pedaling, and some slippage will occur at wheel 28. It can thus be appreciated that arm 31 automatically moves into and out the force transmitting position without the need of an external shifting mechanism for arm 31, but solely by virtue of the inherent torques and forces exerted between the operative elements of the invention. Only the position of wheel 28 along the line of force transmitting positions along the longitudinal length of arm 31 is provided with and requires an external shifting mechanism and force. This force is provided by a manual motive force supplied by the cyclist through cable 39.

Many alterations and modifications may be made by those having ordinary skill in the art without departing from the spirit and scope of the invention. For example, scrapers, wipers, brushes or other means may be added to continually sweep surfaces 25 and 43 clean of water, mud, dust, dirt, oil, grease and other debris to maintain the frictional engagement between surfaces 25 and 43 on one hand and wheel 28 on the other. In addition a housing may be provided around rim driver 32 and driver plate 24 to keep these elements, their surfaces and related elements clean and free of debris which might otherwise interfere with the frictional surface engagements.

The rotation of arm 31 into and out of the line of force transmitting positions is accomplished by means of the frictionally induced torques applied to arm 31 about shaft 27 by rim driver 32 and driver plate 24, which torques arise because of the frictional coupling of wheel 28 to arm 31 at fitting 35 and of shaft 27 to arm 31 at bearing coupling 104. However, if desired a mechanical shifting mechanism similar to that described for shifting mechanism 30 could also be employed to rotate arm 31. Such a mechanism is unnecessary and would be cumbersome, since the dynamic forces between wheel 28, driver plate 24 and rim driver 32 serve to automatically rotate arm 31 into and out of the force transmitting position according to whether the cyclist is pedaling and rear wheel 14 turning. If rear wheel 14 is turning and the cyclist is not pedaling, arm 31 is automatically rotated out of the force transmitting position. If the cyclist is pedaling, arm 31 is automatically rotated into the force transmitting position whether rear wheel 14 is turning or not. If the cyclist is not pedaling and rear wheel 14 is not turning, no force is applied to arm 31 and it remains in whatever position it last assumed.

Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the essential idea of the invention.

I claim:

1. In a bicycle having a frame, a pedal assembly rotatably coupled to said frame, and a bicycle wheel, an improved bicycle transmission comprising:

a driver plate coupled and rotated by said pedal assembly;

a rim driver rotatably coupled to and rotatable with said bicycle wheel; and a transmission driver wheel selectively positionable between said driver plate and said rim driver and in continuous frictional engagement with either one of said driver plate or rim driver;

shifting means for moving said driver wheel radially across said either one of said driver plate or rim driver to provide a continuously variable transmission ratio between said driver plate and said rim driver when said driver plate and rim driver are coupled with each other through said driver wheel, said shifting means automatically disengaging said rim driver from said driver plate by allowing movement of said driver wheel out of engagement with the other one of said driver plate or rim driver, while maintaining said driver wheel in engagement with said either said rim driver or driver plate when freewheeling, said rim driver and driver plate being completely disengaged from each other when said driver wheel is allowed rotate; and said shifting means automatically allowing said driver wheel to move back into engagement with both said driver plate and said rim driver when force is a gain transmitted from said pedal assembly to said bicycle wheel, whereby a continuously variable, free-wheeling bicycle transmission is provided.

2. The transmission of claim 1 further comprising a crank ring coupled to and rotatable with said pedal assembly, said crank ring being coupled to said driver plate to rotate said driver plate through a speed increasing coupling.

3. The transmission of claim 2 wherein said crank ring has a peripheral edge and wherein said crank ring is frictionally coupled to said driver plate along said peripheral edge.

4. The transmission of claim 2 further comprising a driver cog coupled to said driver plate and wherein said crank ring is coupled to said driver cog to turn said driver cog at an increased angular speed relative to angular speed of said pedal assembly.

5. The transmission of claim 4 wherein said driver cog and crank ring have gear teeth, said gear teeth of said driver cog being enmeshed with said gear teeth of said crank ring.

6. The transmission of claim 1 further comprising at least one support bearing coupled to said frame, said support bearing contacting said driver plate to stiffen said driver plate to reduce flexing of said driver plate when in contact with said driver wheel.

7. The transmission of claim 1 wherein said rim driver further comprises a reinforcing hub cap to prevent said rim driver from flexing when in contact with said driver wheel.

8. In a bicycle having a frame, a pedal assembly rotatably coupled to said frame, and a bicycle wheel, an improved bicycle transmission comprising:

a driver plate coupled and rotated by said pedal assembly;

a rim driver rotatably coupled to and rotatable with said bicycle wheel; and a selectively positionable shifting means rotatably coupled to said driver plate and rim driver, said shifting means providing a continuously variable transmission ratio between said driver plate and said rim driver and automatically disengaging from said rim driver when said driver plate ceases to rotate while said rim driver continues to rotate with said bicycle wheel, wherein said shifting means frictionally couples said driver plate to said rim driver;

wherein said rim driver and driver plate are frictionally coupled through said shifting means by selectively positioning a transmission driver wheel in contact with said driver plate and rim driver when force is exerted through said pedal assembly to said bicycle wheel; and wherein said driver plate and rim driver each has a conical surface with a line defined on each of their respective conical surfaces being parallel and opposing each other and lying in a predetermined single plane, said shifting means has a transmission driver wheel making frictional contact with said driver plate and rim driver at said parallel lines when disposed in a force transmitting relationship between said driver plate and rim driver, said shifting means maintaining said transmission driver wheel in contact with said conical surface of said driver plate at all times, whereby a continuously variable free-wheeling bicycle transmission is provided.

9. The transmission of claim 8 wherein said driver plate has an axis of rotation and wherein said shifting means is rotatable about said axis of rotation of said driver plate, said transmission driver wheel being rotated about said axis of rotation out of and into contact with said conical surface of said rim driver according to whether force is being applied through said pedal assembly to said bicycle wheel or not.

10. In a bicycle having a frame, a pedal assembly and a bicycle wheel, an improved bicycle transmission comprising:

a drive shaft;

a driver plate coupled to and rotatable with said drive shaft, said driver plate further being coupled and rotated by said pedal assembly, said driver plate having a conical surface with a predetermined taper;

a shifting arm rotatably coupled to said drive shaft, said shifting arm having a longitudinal length and being disposed to retain a parallel direction at all times with said conical surface of said driver plate;

a transmission driver wheel rotatably coupled to said shifting arm and selectively disposable along said longitudinal length of said shifting arm;

a rotatable rim driver coupled to said bicycle wheel for rotating said bicycle wheel with said rim driver, said rim driver having a conical surface with a taper substantially matching said predetermined taper of said driver plate, said transmission driver wheel being selectively disposable between said conical surface of said rim driver and said conical surface of said driver plate to transmit rotary force between said driver plate and rim driver when said pedal assembly rotates said driver plate, said transmission driver wheel automatically moving out of contact with said rim driver after said driver plate ceases to transmit rotary force between said pedal assembly and said bicycle wheel, whereby a continuously variable frictionally driven transmission is provided for said bicycle which also permits free wheeling of said bicycle wheel.

11. The transmission of claim 10 further comprising a speed increasing means coupled between said pedal assembly and said driver plate for increasing angular speed of said driver plate relative to angular speed of said pedal assembly.

12. The transmission of claim 10 wherein said bicycle wheel has an inner rim surface and wherein said rim driver frictionally contacts said inner rim surface of said bicycle wheel to rotate said bicycle wheel.

13. The transmission of claim 10 further comprising means for reducing flexing of said driver plate when said transmission driver wheel bears against said driver plate and rim driver.

14. The transmission of claim 10 further comprising means for reducing flexing of said rim driver when said transmission driver wheel bears against said conical surfaces of said driver plate and rim driver.

15. A method of providing continuously variable transmission of speed between a pedal assembly and a bicycle wheel in a bicycle comprising the steps of:

converting pedaling motion through said pedal assembly into rotary motion of a driver plate, said driver plate having a conical surface with a predetermined taper;

maintaining a transmission driver wheel rotatable about a shifting arm in contact with said conical surface of said driver plate;

moving said transmission driver wheel on said shifting arm into simultaneous contact between said driver plate and a rim driver having a conical surface in contact with said transmission driver wheel, said conical surface of said rim driver having a predetermined taper substantially equal to said predetermined taper of said driver plate; and transmitting rotary force from said pedal assembly through a driver plate and said transmission driver wheel into said rim driver and bicycle wheel to rotate said bicycle wheel, whereby a frictional transmission which is continuously variable is provided between said pedal assembly and said bicycle wheel.

16. The method of claim 15 further comprising the step of increasing speed of rotary motion from said pedal assembly to said driver plate.

17. The method of claim 15 further comprising the step of moving said transmission driver wheel longitudinally along said shifting arm to vary speed transmission from said pedal assembly to said bicycle wheel.

18. The method of claim 15 further comprising the step of automatically moving said transmission wheel out of contact with said rim driver when said rotary force is no longer supplied between said pedal assembly and said bicycle wheel to permit said bicycle wheel to free-wheel with respect to said pedal assembly.

* * * * *